United States Patent [19]

Nickola

[11] Patent Number: 4,833,566

[45] Date of Patent: May 23, 1989

[54] PLASTIC JACKET FOR UTILITY MOUNTING PEDESTAL

[76] Inventor: Anne Nickola, G 6261 N. Saginaw Rd., Mount Morris, Mich. 48458

[21] Appl. No.: 140,409

[22] Filed: Jan. 4, 1988

[51] Int. Cl.⁴ .............................................. H02B 9/00
[52] U.S. Cl. ..................................... 361/369; 52/298; 248/156; 403/109
[58] Field of Search .............................. 404/9, 10, 11; 52/126.6, 118, 263, 296, 297, 298 X; 174/38, 45 R; 248/156 X, 159, 295.1, 297.3, 354.6; 403/109 X; 361/332, 334, 331, 364–373, 417, 419, 420, 428

[56] References Cited

U.S. PATENT DOCUMENTS

| | | | |
|---|---|---|---|
| Re. 27,400 | 6/1972 | Nickola | 361/332 |
| Re. 31,359 | 8/1983 | Nickola | 361/332 |
| 2,206,625 | 7/1940 | Beach | 52/298 |
| 2,841,634 | 7/1958 | Kimball | 174/45 R |
| 3,502,785 | 3/1970 | Nickola | 361/369 |
| 3,614,538 | 10/1971 | Nickola | 361/364 |
| 4,120,125 | 10/1978 | Cvetan | 52/298 |
| 4,343,567 | 8/1982 | Sarver | 43/109 |
| 4,751,610 | 6/1988 | Nickola | 361/369 |

Primary Examiner—Gerald P. Tolin
Attorney, Agent, or Firm—Gifford, Groh, Sheridan, Sprinkle & Dolgorukov

[57] ABSTRACT

A pedestal for mounting a utility supply device adjacent a mobile home includes a metal post partly embedded in the ground, carrying the supply device on an upper end thereof; and a plastic jacket inserted in the ground, receiving the ground-engaging portion of the post therein. The plastic is preferably rigid, chemically nonreactive, nonconductive and resistant to water, corrosion and fire. A pair of lateral feet are formed on the bottom of the jacket so as to prevent the accidental or facile removal of the jacket and encased post from the ground.

3 Claims, 1 Drawing Sheet

PLASTIC JACKET FOR UTILITY MOUNTING PEDESTAL

BACKGROUND OF THE INVENTION

1. Field of the Invention

The present invention relates to utility meter mounting pedestals, and more particularly a pedestal of the type to be partly inserted into the ground.

2. Description of the Prior Art

In the past, utility services such as electrical power, telephone service and natural gas supply have been provided for mobile homes through separate lines and conduits leading from meters and junction boxes. The lines and conduits were all supported in the vicinity of the mobile home, but were positioned at separate locations selected by each utility company. In trailer parks, if there was no conveniently located tree or utility pole in proximity to the mobile home, it was necessary for each utility company to drive a post into the ground to support the meter or junction box servicing one or more nearby mobile homes. The plurality of posts necessary for this purpose resulted in a tangled web of electrical wires, telephone wires and gas lines. Furthermore, when a mobile home would be moved from its parking site, each of the utility meters and junction boxes had to be disconnected from the mobile home and, if the meters or junction boxes were mounted upon the mobile home itself, they had to be physically removed therefrom at a considerable cost of labor.

These and other drawbacks were overcome by the utility mounting pedestal disclosed in my U.S. Pat. No. 3,614,538 and my U.S. Pat. No. Re. 31,359. The pedestal in those patents comprises a hollow, rectangular and elongated metal post supported in an upright position in the ground, and extending thereabove. Preferably, the pedestal includes a portion buried in the ground a sufficient depth to normally assure adequate affixment in position. An L-shaped mounting bracket is supported on the top of the post, to which a conventional electric meter and an electrical power outlet box are connected. A telephone junction box is also carried by or connected to the post. The meter, box, and bracket are grounded by connection to the metal post, or connection to a ground wire running through the hollow interior of the post, connected to other grounded means external to the post.

While my prior mounting pedestal has functioned more than adequately for its intended purpose, unexpected and uncontrollable changes in the condition of the ground (for example, by flooding, unusually high ground water levels, removal of the adjacent supportive ground by nearby digging, or the like) or accidental impact by a vehicle may allow or cause my pedestal (indeed, any of the separate prior art posts as well) to be partly or fully removed from the ground. The danger from ruptured gas lines or snapped electrical units resulting from this should be evident, in addition to the mere inconvenience of the disruption of service. Moreover, since the post is preferably constructed from metal, the post itself is potentially subject to corrosion or rust over an extended period of time time of exposure to the elements and ground water. The lowering of ground water pH or increase in soil erosion, through increasingly acid rain, may contribute to these problems.

SUMMARY OF THE INVENTION

The present invention overcomes these and other problems by providing an article for the protection of and improved seating of a utility mounting pedestal post in the ground. More particularly, the apparatus of the present invention comprises an elongated jacket closely fitted about and preferably molded about the lower portion of the post normally received in the ground. The jacket is preferably constructed from a rigid plastic material which is water, corrosion, and fire resistant, as well as nonconductive and impact resistant. Taking these characteristics together, the jacket can be described simply as "nonreactive".

The jacket preferably includes a means for retaining the jacket and post in the ground, located opposite the upper end carrying the meter or power box. The retaining means preferably comprises a perpendicular pair of webs or feet preventing the ready longitudinal withdrawal of the pedestal and post from the ground. The post is preferably of the type described and claimed in my foregoing patents, and includes an aperture beneath the ground for the passage therethrough of ground connections or electrical connections to the various utiilty supplying means. A registering aperture is formed through the side wall of the elongated jacket.

The jacket substantially eliminates direct contact of the post with the ground, shielding the external surface of the post from direct contact with the ground water. While the final interior of the post may be exposed to dampness for a substantial portion of the length of the post this will likely be mere condensation, having a power ionic content than of the ground water. The opportunity for corrosion or rusting of the metal of the post is thus reduced. Moreover, because the post is preferably firmly affixed to the jacket, the retaining means prevents the ready removal of the post from the ground. Particularly when the outer surface of the post is fish-scaled, or formed with one or more triangular bosses allowing easy insertion but inhibiting withdrawal of the post from the jacket, the jacket can be disposed in the ground prior to locating the post therein. This allows preliminarily planned locations for the posts to be changed prior to insertion of the posts, facilitating the task of laying out a trailer part plan.

BRIEF DESCRIPTION OF THE DRAWING

A better understanding of the present invention will now be had upon reference to the following detailed description, when read in conjunction with the accompanying drawing, wherein like reference characters refer to like parts throughout the several views, and in which.

DETAILED DESCRIPTION OF THE PREFERRED EMBODIMENT OF THE PRESENT INVENTION

Figure 1:
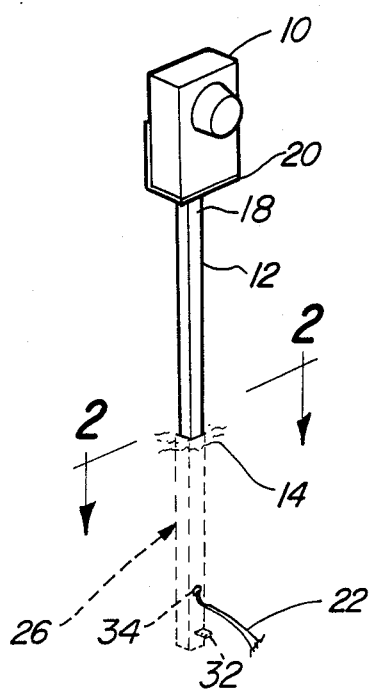
FIG. 1 is a perspective view of the preferred embodiment of the present invention.
Figure 2:
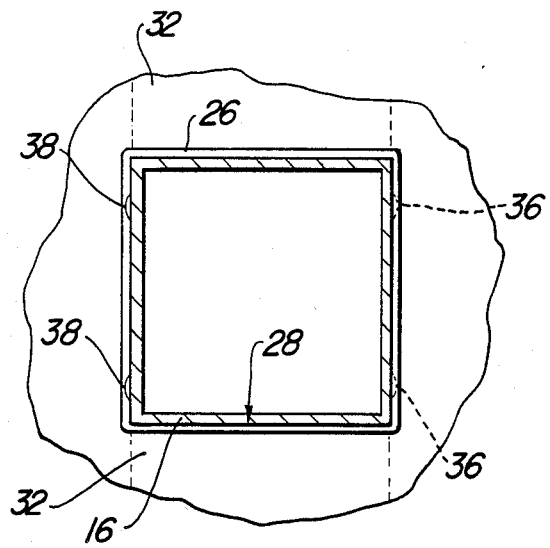
FIG. 2 is a cross sectional view taken along line 2—2 of FIG. 1.
Figure 3:
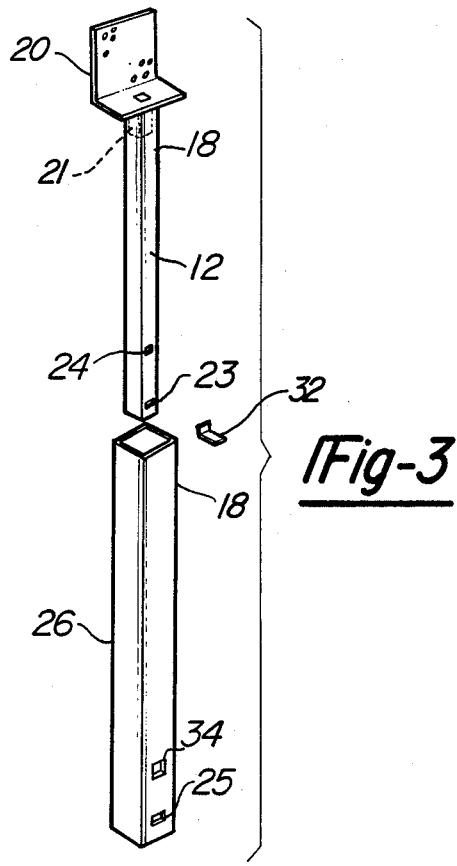
FIG. 3 is an exploded perspective view of the preferred embodiments of the present invention.

With reference now to the Figures, the apparatus of the present invention is thereshown in conjunction with a free-standing elongated metal post 12, supporting above the ground 14 an electric meter 10 or other means for providing the utility service. The post 12 is preferably of metal and possesses an external surface having a substantially uniform cross section, for example, a square cross section. The meter 10 is carried on an upper end 18 of the post 12 while a lower portion 16 of the post 12 (opposite the upper end 18 and meter 10) is embedded in the ground.

Means are provided for affixing the meter 10 to the upper end 18 of the post 12. The affixing means preferably comprises an L-shaped bracket 20 including a plurality of mounting holes formed therein and a hollow tubular connector 21 received in the upper end 18 of the post 12 for passage therethrough of an operative connector 22, for example, a ground cable, electrical power supply cable or other utility-related connection. The connector 22 extends through the hollow interior of the post 12 to a location beneath the surface of the ground 14 at which point the connector 22 exits the post through an aperture 24 formed through the side wall of the post 12. The connector 22 then extends to a common supply means, ground or other appropriate service related item.

The foregoing pedestal assembly is preferably of the type disclosed in my U.S. Pat. No. 3,614,538 or my U.S. Pat. No. Re. 31,359.

The apparatus of the present invention comprises an elongated jacket 26 closely fitted about the lower post portion 16 which is normally disposed in the ground 14. The elongated jacket 26 possesses a cross section dimensioned closely dimensioned to the cross section of the post 12, for example, a square cross section, and includes an internal portion 28 preferably molded about the external surface of the metal post 12. The jacket 26 is constructed from a rigid, nonreactive material, for example, a resinous plastic. "Nonreactive" is intended to encompass at least one and preferably all of resistance to water, corrosion and fire; nonconductance and; resistance to impact, for example, at least resistant to the impact of a shovel during manual digging in the ground adjacent the post 12. An aperture 34 is formed through the sidewall of the jacket 26 in registration with the aperture 24 of the post 12 for passage therethrough of the ground or other connector 22.

The jacket 26 includes a means 30 for retaining the jacket 26 and the encased lower portion 16 of the post 12 in the ground. The retaining means 30 preferably comprises a pair of laterally opposed planar feet 32 disposed perpendicularly to the post 12 and jacket 26 and attached to the jacket adjacent its upper end. The feet 32 preferably have a lateral width substantially equal to that of the jacket 26, and a length approximately double the width of the jacket 26. The feet 32 can be attached to jacket 26 by any suitable means such as an epoxy cement or merely snapped into a retaining clip (not shown). Preferably feet 32 are attached by passing through aligned slots 23 and 25 in the post 12 and jacket 26.

Preferably, at least one face of the post 12 and the jacket 26 are formed with a plurality of recesses 36 and a matching plurality of bosses 38, respectively, for firmly retaining the post 12 in the jacket 26. The bosses 38 can be angled (forming a partial or complete alligator surface) allowing the sliding insertion of the post 12 into the jacket 26, but preventing the sliding removal of the post 12 from the jacket 26. The bosses 38 can be sufficiently sharp to cut or form the recesses 36 into the internal portion 28 of the jacket 26, upon insertion of the post 12 into the jacket 26. Means for limiting the insertion of the post 12 into the jacket 26 (such as a stop) can be included as well.

Use of the apparatus according to the present invention is straightforward. When the jacket 26 is molded or otherwise formed about the post 12, a suitable site for fixing of the post 12 in the ground 14 is selected, and a hole having a depth substantially equal to the length of the jacket 26 is dug in the ground. The jacket 26 and, if encased, the lower portion 16 of the post 12 are placed in the hole, and the ground or other connector 22 connected to the appropriate article after which the hole is filled to firmly fix the post 12 in its desired location. Alternatively, if the apparatus is dimensioned such that the post 12 is slid into the jacket 26, only the jacket 26 is disposed in the ground 14. The post 12 can then be slid into the jacket 26, the connection of the ground 22 made, and the hole subsequently filled; or the jacket 26 can merely serve as an indicator for the future position of the post 12, and the hole filled temporarily until such time as the post 12 is fixed therein.

The present invention thus serves an an adjunct to my earlier meter mounting pedestal in reducing the liklihood of corrosion of the metal post of the pedestal or accidental removal of the pedestal assembly from the ground. Having described my invention, however, many modifications thereto will become apparent to those skilled in the art to which it pertains, without deviation from the spirit of the invention, as defined by the scope of the appended claims.

I claim:

1. An apparatus comprising a vertically disposed elongated metal post having a lower portion of substantially uniform and square cross section inserted to a predetermined depth beneath the ground, and an upper end opposite said lower portion carrying means for supplying at least one utility service; the combination comprising:

an elongated, hollow jacket composed of a resinous plastic which is substantially nonconductive, chemically nonreactive, and resistant to water, corrosion and fire; said jacket having a length substantially equal to said predetermined depth, vertically disposed in the ground and said jacket having a substantially uniform and square cross section which closely receives said lower portion of said post therein; the interior surface of said jacket including means cooperating with the exterior surface of said post for retention of said post in said jacket portion; and means disposed on said jacket which retains said jacket in the ground, comprising planar feet means disposed perpendicularly to an exterior surface of said jacket;

said jacket and said lower post portion having registering apertures disposed through a sidewall of each.

2. The invention according to claim 1, wherein one of said exterior of said elongated metal post and said interior of said jacket comprises a retaining boss, and the other of said interior of said jacket and said exterior of said elongated post comprise a recess which receives said boss therein, and retains said post in said jacket.

3. The invention according to claim 1 wherein said jacket has at least one recess formed therein for receiving at least one boss on said lower post portion.

* * * * *